UNITED STATES PATENT OFFICE.

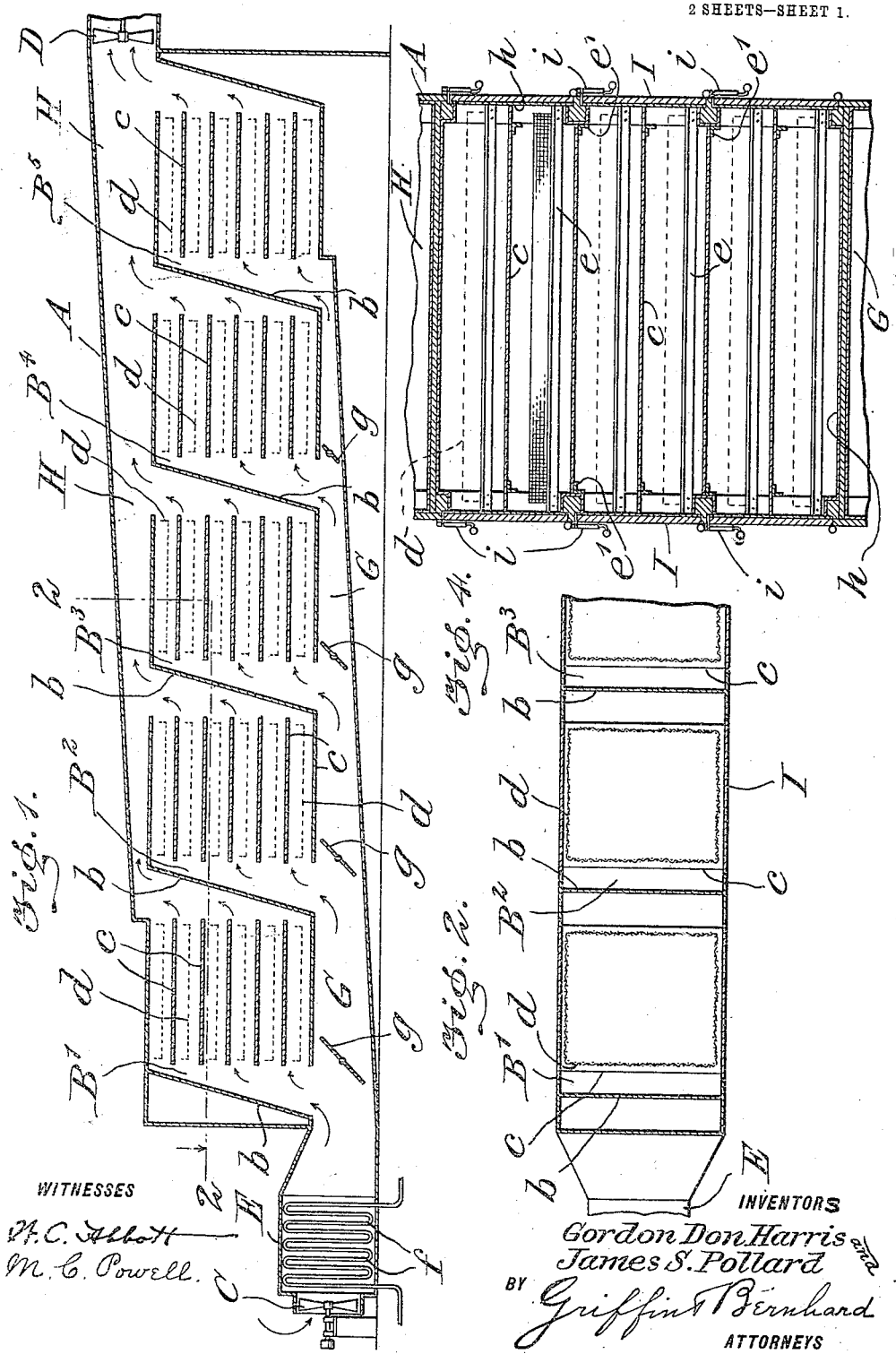

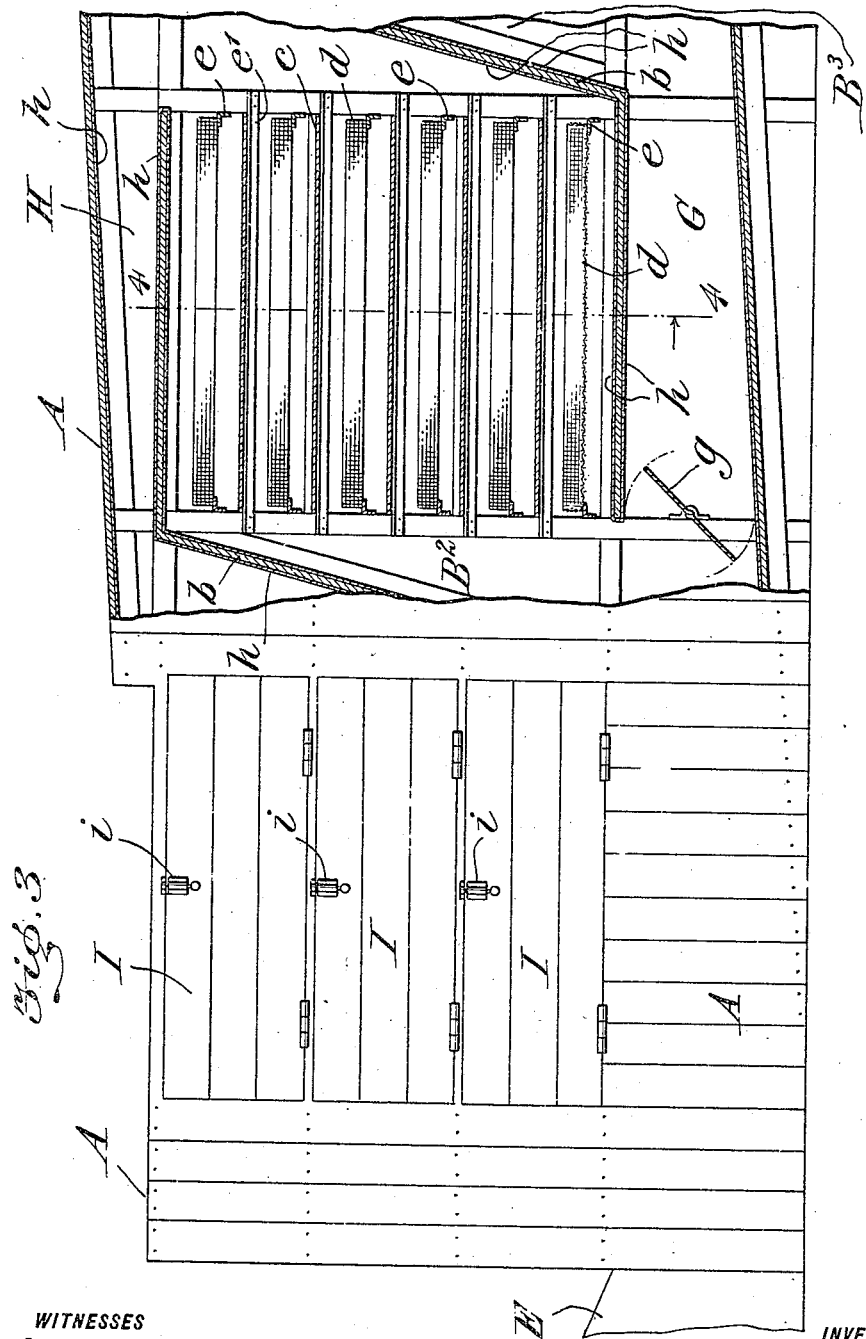

GORDON DON HARRIS, OF BAY SHORE, AND JAMES S. POLLARD, OF MAMARONECK, NEW YORK, ASSIGNORS, BY MESNE ASSIGNMENTS, TO GENERAL DEHYDRATOR COMPANY, A CORPORATION OF NEW YORK.

APPARATUS FOR DEHYDRATING FOODS.

1,017,412.     Specification of Letters Patent.     Patented Feb. 13, 1912.

Application filed February 13, 1909, Serial No. 477,667. Renewed August 22, 1911. Serial No. 645,412.

*To all whom it may concern:*

Be it known that we, GORDON DON HARRIS, a citizen of the United States, residing at Bay Shore, Suffolk county, Long Island, and State of New York, and JAMES S. POLLARD, a citizen of the United States, residing at Mamaroneck, Westchester county, and State of New York, have jointly invented a certain new and useful Apparatus for Dehydrating Foods, of which the following is a specification.

This invention is an apparatus for dehydrating foods, particularly fruits and vegetables, and the object in view is to expeditiously and thoroughly remove or eliminate the aqueous constituents from the food products under treatment, and to effect these results in a simple and economical manner.

It is well established that decay or deterioration will not take place in fruits or vegetables in the absence of moisture, and the present invention is aimed at removing from said fruits and vegetables the watery constituents on which decay depends, but, moreover, to eliminate this watery element so rapidly that the residuary constituents of the fruits and vegetables remain practically unchanged. In other words, the invention is an apparatus for producing dehydrated fruits and vegetables retaining the normal characteristics of the fresh products, except that the water has been eliminated therefrom.

The following table shows substantially the weight of aqueous vapor contained in one hundred cubic feet of air saturated therewith, at the temperatures specified.

| | | |
|---|---|---|
| At 50 degrees Fahrenheit | .936 | ounces. |
| At 70 " " | 1.826 | " |
| At 90 " " | 3.386 | " |
| At 113 " " | 6.488 | " |
| At 131 " " | 10.350 | " |

In practicing the invention we endeavor to deliver the heated air to the apparatus at a temperature of substantially 61 degrees (F) higher than the outside air. For example, if the outside air has a temperature of 70 degrees (F), we would heat it to substantially 131 degrees (F) prior to its introduction into the dehydrating apparatus. Assuming that the air at 70 was saturated with moisture, one hundred cubic feet thereof would carry 1.826 ounces of moisture, and by raising the temperature thereof to 131 degrees, it would carry, when saturated, 10.350 ounces of moisture, or an increase, due to the elevation of temperature, of substantially 8.5 ounces. In other words, under the conditions specified, each 100 cubic feet of air would remove from the food products, theoretically, 8½ ounces of moisture. In practice, however, in order to thoroughly eliminate the water so rapidly that the fruits and vegetables are not otherwise changed from their natural condition, we employ, as a rule, about 90% more air than the theoretical quantity above specified.

The amount of water in all edible fruits and vegetables being known, or capable of determination, the volume of air to be heated and driven through the dehydrating apparatus may be easily computed.

In the accompanying drawings, we have illustrated one practical embodiment of the invention, but the construction shown therein is to be understood as illustrative only, and not as defining the limits of the invention.

Figure 1 is a longitudinal cross section of the apparatus, partly in diagrammatic form. Fig. 2 is a section taken on line 2—2 of Fig. 1. Fig. 3 is a view in elevation, showing parts of both the inside and outside of the apparatus, and Fig. 4 is a sectional elevation taken on line 4—4 of Fig. 1.

In the drawings, A, represents the main or outer casing of the dehydrating apparatus, which is divided into a plurality of chambers, $B^1$, $B^2$, $B^3$, $B^4$, $B^5$ by means of partitions, $b$, preferably inclined. Each of the chambers, $B^1$ to $B^5$ is divided into a series of compartments by horizontal partitions $c$, and in each one of these compartments is a foraminous tray $d$, adapted to contain the fruits or vegetables to be treated.

The trays $d$ are supported at their sides running lengthwise of the main casing by means of angle-irons $e$, and the depth of these trays is considerably less than the distance between the partitions $c$, thereby providing a free space above and below each tray, and compelling the air to thoroughly circulate around and through the fruit or vegetables contained in the trays.

Air is forced into the apparatus by means of a blower C, and exhausted therefrom by means of a second blower D. The air after passing through the blower C is heated to the temperature desired, in the heating chamber E by means of a steam coil $f$, which in practice is so constructed that the incoming air may be subjected to any extent of heating surface found necessary.

A tapering trunk or main, G, contains the pivoted deflectors $g$, by which the qantity of air delivered to each of the compartments $B^1$ to $B^5$ may be regulated. The air escaping from the several compartments enters a tapering trunk or off-take H, tapering in an opposite direction from the inlet trunk, G, whence it escapes from the apparatus through the blower or fan D.

Access may be had to the several chambers $B^1$ to $B^5$ for the purpose of introducing and removing the trays $d$ therefrom, through the medium of the pivoted doors I, having latches $i$, there being, in practice, three doors provided in the casing A at the side of each of the said compartments.

By making the in-take and out-going trunks or mains G and H respectively in the tapering form described, and by inclining the partitions, $b$, as described, the course of the air through the apparatus is assisted, and each of the chambers receives its proper proportion of air. It will be noted, moreover, that as air escapes from the compartments containing the trays $d$, it passes directly into the out-going trunk H, without being permitted to enter any other compartment, thereby supplying each compartment with freshly heated air, and precluding the air, after it has absorbed moisture from the fruit or vegetables in one compartment from again entering the same or any other compartment.

The frame work of the apparatus, and the outer casing, are preferably made of wood, but in practice it has been found desirable to line the interior thereof, including the partitions and in-take and out-going trunks, with galvanized iron $h$, for the purpose of providing a smooth and sanitary surface on the interior of the apparatus.

In practice we have found it desirable and advantageous to have the in-going air enter the apparatus at a pressure of about three ounces, and to allow it to escape therefrom at a pressure of about two ounces, thereby maintaining a slight pressure in the apparatus at all times during its operation.

The material operated upon, such as bananas, apples, carrots, turnips, parsnips, potatoes, etc., are usually peeled and then cut to the desired size before placing the same in the trays. While the length of time required for effecting complete dehydration varies according to the material treated, and the particular method of operation, yet, as a rule, we are enabled to completely eliminate the liquid or moisture from said materials in one hour.

It will, of course, be understood that slight modifications may be made in the apparatus described, as well as in the mode of operation set forth, without departing from the spirit or substance of our invention.

While the claims in this application are restricted to an apparatus, we may add that the novel process herein disclosed forms the subject matter of a companion application, filed by us on Aug. 3, 1909, Serial No. 511,038.

Having thus fully described the invention, what we claim as new, and desire to secure by Letters Patent is:

1. In an apparatus of the class described, a casing, an air inlet and an air exit thereto, a series of inclined partitions therein forming a plurality of chambers, and a series of partitions in each chamber dividing the chamber into a number of compartments.

2. In an apparatus of the class described, a casing, an air inlet and an air exit thereto, a series of inclined partitions therein forming a plurality of chambers, a series of partitions in each chamber dividing the chamber into a number of compartments, and a foraminous tray in each compartment.

3. In an apparatus of the class described, a casing, a series of partitions within the same forming a plurality of chambers, a series of partitions within each chamber and dividing the same into a series of compartments, said last mentioned partitions being transverse to the first named partitions, a tapering air in-take common to said chambers, and a tapering air exit also common to said chambers.

4. In an apparatus of the class described, a casing, a series of partitions within the same forming a plurality of chambers, a series of partitions transverse to, and disconnected from, the first named partitions, said second named partitions being within each chamber and dividing the same into separate compartments, an in-take common to said chambers, an air exit also common to said chambers, a blower C forcing air into said air in-take, and a fan for exhausting air from said air exit.

5. In an apparatus of the class described, a casing, a series of partitions within the same forming a plurality of chambers, each of said chambers being provided with a series of horizontal partitions arranged to divide the chamber into compartments, said compartments of each chamber having a common inlet and a common outlet, an air in-take common to the inlets of all said chambers, an air exit also common to outlets of all said chambers, a blower C for forcing air into said air in-take, a fan for exhausting air from said air exit, and an air heater intermediate said blower and the air in-take.

6. In an apparatus of the class described, a casing, a series of upright partitions within the same, forming a plurality of chambers, each of said chambers having a series of horizontal partitions disconnected from the upright partitions, a tapering air inlet common to all of said chambers, a plurality of deflectors in said air in-take for the purpose of regulating the quantity of air delivered to each of said chambers, and an air outlet common to said chambers and tapering oppositely to that of the air inlet.

7. In an apparatus of the class described, a casing, a series of inclined partitions therein, forming a plurality of chambers, a series of partitions in each chamber dividing the chamber into a number of compartments, a tapering air in-take common to the several chambers, a tapering air exit also common to the several chambers, means for forcing air into air in-take, and means for exhausting air from said air exit.

8. In an apparatus of the class described, a casing, an air inlet and air exit thereto, a series of inclined partitions in said casing forming a plurality of chambers therein, a series of imperforate partitions in each of said chambers for dividing the chambers into a number of compartments, foraminous trays positioned within said chambers between the partitions, and doors on either side of said casing for providing access to the trays.

9. In an apparatus of the class described, a casing provided with a series of chambers, a plurality of imperforate horizontal partitions within said chambers, means positioned between the partitions for supporting drying trays a tapering air in-take common to said chambers, a tapering air exit also common to and extending past all of said chambers, means for forcing heated air into the air in-take and means for exhausting air from said air exit.

In testimony whereof we have signed our names to this specification in the presence of two subscribing witnesses.

GORDON DON HARRIS.
JAMES S. POLLARD.

Witnesses:
H. I. BERNHARD,
M. C. POWELL.